United States Patent [19]
Wojcik et al.

[11] Patent Number: 5,755,334
[45] Date of Patent: May 26, 1998

[54] METHOD AND APPARATUS FOR MOUNTING A PANEL ON A SUPPORT MEMBER

[75] Inventors: John Wojcik, Long Grove, Ill.; Roger M. Maki, Hibbing, Minn.

[73] Assignee: Illinois Tool Works Inc., Glenview, Ill.

[21] Appl. No.: 618,513

[22] Filed: Mar. 19, 1996

[51] Int. Cl.$^6$ .......................................... B07B 1/49
[52] U.S. Cl. ..................... 209/399; 209/405; 209/409; 209/412
[58] Field of Search ................... 209/399, 405, 209/408, 409, 411, 412

[56] References Cited

U.S. PATENT DOCUMENTS

| | | |
|---|---|---|
| 3,795,311 | 3/1974 | Martin . |
| 3,900,628 | 8/1975 | Stewart . |
| 3,980,555 | 9/1976 | Freissle . |
| 4,141,821 | 2/1979 | Wolff . |
| 4,219,412 | 8/1980 | Hassall . |
| 4,265,742 | 5/1981 | Bücker et al. . |
| 4,278,535 | 7/1981 | Wolff . |
| 4,383,919 | 5/1983 | Schmidt .................... 209/399 |

(List continued on next page.)

FOREIGN PATENT DOCUMENTS

| | | |
|---|---|---|
| 0567361 | 10/1993 | European Pat. Off. . |
| 197810 | 1/1978 | France . |
| 1186311 | 1/1965 | Germany . |
| 3544752 | 5/1987 | Germany . |
| 3606854 | 9/1987 | Germany . |
| 74 5092 | 8/1975 | South Africa . |
| 75 2229 | 3/1976 | South Africa . |
| 1480894 | 5/1989 | U.S.S.R. . |
| WO 83/02075 | 6/1983 | WIPO . |
| WO 89/08509 | 9/1989 | WIPO . |
| WO 90/05594 | 5/1990 | WIPO . |

OTHER PUBLICATIONS

Isenmann Drahterzeugnisse GmbH, "ISEPREN" Sales Brochure, received 23 May 1985, 4 pages.

Don Schreckengost, "Screening Surfaces Offer Many Choices", reprinted from Nov. 1988 to Mar. 1989 issues of Coal magazine, pp. 46-51.

*Primary Examiner*—David H. Bollinger
*Attorney, Agent, or Firm*—Mark W. Croll; Thomas W. Buckman; John P. O'Brien

[57] ABSTRACT

A method and apparatus for mounting a panel on a rail member having first and second resilient legs separated by a channel. A groove disposed along a first side of the panel receives a portion of one of the resilient legs of the rail member. The groove extends from a lower surface of the panel toward an upper surface of the panel so that the upper surface extends over the resilient leg received in the groove. The groove includes a first side surface with a first inclined portion and a second side surface with a second inclined portion. The second side surface of the groove is engagable with the inner leg surface of the resilient leg received in the groove to outwardly urge the resilient leg away from the channel of the rail member and toward the first inclined portion of the groove to retain the panel on the rail member. An elongate retention member having a base disposable through a recess in the panel and into the channel of the rail member outwardly urges one of the resilient legs away from the channel and toward the panel to further retain the panel on the rail member.

10 Claims, 2 Drawing Sheets

U.S. PATENT DOCUMENTS

| | | |
|---|---|---|
| 4,409,099 | 10/1983 | Wolff . |
| 4,661,245 | 4/1987 | Rutherford et al. . |
| 4,674,251 | 6/1987 | Wolff . |
| 4,716,694 | 1/1988 | Freissle . |
| 4,752,512 | 6/1988 | Wolff . |
| 4,757,664 | 7/1988 | Freissle . |
| 4,762,610 | 8/1988 | Freissle . |
| 4,871,288 | 10/1989 | Schmidt et al. . |
| 4,882,044 | 11/1989 | Freissle . |
| 4,885,040 | 12/1989 | Wolff . |
| 4,892,767 | 1/1990 | Freissle . |
| 4,909,929 | 3/1990 | Tabor . |
| 4,960,510 | 10/1990 | Wolff . |
| 5,085,324 | 2/1992 | Dehlen . |
| 5,112,475 | 5/1992 | Henry, Jr. . |
| 5,213,217 | 5/1993 | Galton et al. . |
| 5,361,911 | 11/1994 | Waites, Sr. et al. . |
| 5,377,846 | 1/1995 | Askew . |
| 5,398,817 | 3/1995 | Connolly et al. .......... 209/399 |
| 5,462,175 | 10/1995 | Bokor . |

METHOD AND APPARATUS FOR MOUNTING A PANEL ON A SUPPORT MEMBER

BACKGROUND OF THE INVENTION

The invention generally relates to a method and apparatus for mounting a panel on a support member, and more specifically for mounting filter screen panels on spaced apart rail members to form a deck usable for materials screening in vibrating screening operations.

Panels with side portions mountable on protruding legs of a support member have many applications including the arrangement of an array of adjacent panels to form a deck. In materials screening applications for example a plurality of panels are adjacently mounted on a grid or frame having substantially parallel longitudinal support members to form a materials screening deck, which is sometimes arranged on an incline to facilitate flow of material over the deck. It is often a requirement that the panel or array of panels be fastened to the frame as in applications where the panels, like ceiling panels, are suspended from the support member, and in applications where the panels are inclined or vertically oriented so that gravity alone is insufficient to retain the panels on the frame. In materials screening decks of the type that are vibrated to facilitate the passage of materials over the deck, the panels must be fastened to the rail members to prevent separation of the panels during vibration of the deck.

In the past, panels have been fastened to the support members by fastening members like bolts or locking pins that extend through apertures on at least opposing sides of the panel and into corresponding receiving holes in the support member. U.S. Pat. No. 5,213,217 to Galton et al. for example discusses locking pins that are first anchored between upwardly extending legs of spaced apart rail members. The locking pins are then snapped into recesses in apertures through the panels as the panels are mounted onto the rail members. Others have proposed first mounting the panel on the support member and then inserting the fastening member through the panel and into the hole in the support member. These applications however have the disadvantage that the apertures through the panels must be accurately aligned with either the pins anchored in the support member or with the holes in the support member before installation of the fastening member. The alignment of apertures and installation of fasteners are at best laborious procedures. In addition, it is often not possible to interchange panels from various manufacturers on a particular support member because the apertures in the panels do not properly align with the pins or holes in the support member, which is in part due to a lack of standardization in most industries. Moreover, the fastening members of many inventions, including the locking pins discussed U.S. Pat. No. 5,213,217 to Galton et al., must often be destroyed to remove the fastening member from the support member to permit removal of a panel or replacement of a worn fastening member.

U.S. Pat. No. 5,377,846 to Askew discusses panels supported by an underlying support frame without the use of locking pins. The support frame is comprised of a grid of support bars with a substantially parallel arrangement of rail members mounted thereon by bolts or other fastening means. Each rail includes a pair of upwardly extending legs separated by a channel, and opposing sides of each panel include a longitudinal groove that receives an upwardly extending leg of adjacent rail members. Each upwardly extending leg of the rail member includes a lip laterally protruding toward the channel of the rail member. The lip is snapped into a laterally protruding recess along the longitudinal groove of the panel, which retains the panel on the rail member. Protuberances formed by discontinuities in the longitudinal grooves of the panel extend into corresponding cutout portions of the rail member to prevent sliding movement of the panel along the rails. The protuberances in the panels however must be first aligned with the cutouts in the rail member before mounting the panel thereon. In addition, the cutouts and the laterally protruding lip on the legs of the rail member increase the overall cost of the rail member.

In view of the discussion above, there exists a demonstrated need for an advancement in the art of mounting panels on support members.

It is therefore an object of the invention to provide a novel method and apparatus for mounting panels on support members which overcomes problems in the prior art.

It is also an object of the invention to provide a novel method and apparatus for mounting panels on support members that is economical to practice and manufacture.

It is another object of the invention to provide a novel method and apparatus for mounting a panel on a rail member having a resilient leg outwardly urged into retaining engagement with the panel to retain the panel on the rail member.

It is a further object of the invention to provide a novel method and apparatus for mounting a panel on a rail member having a resilient leg outwardly urged into retaining engagement with the panel by an elongate retention member disposed into a channel of the rail member to retain the panel on the rail member.

Accordingly, the invention is drawn to a method and apparatus for mounting a panel on a rail member having first and second resilient legs separated by a channel wherein each resilient leg has an outer leg surface and an inner leg surface. The panel includes first and second substantially opposing sides, and first and second opposing outer surfaces. A groove is disposed along the first side of the panel for receiving a portion of one of the resilient legs of the rail member. The groove extends from the second outer surface toward the first outer surface so that the first outer surface of the panel extends over the resilient leg received in the groove. The groove includes a first side surface with a first inclined portion and a second side surface with a second inclined portion. The second side surface of the groove is engagable with the inner leg surface of the resilient leg received in the groove to outwardly urge the resilient leg away from the channel of the rail member and toward the first inclined portion of the groove to retain the panel on the rail member. An elongate retention member having a base disposable through a recess in the panel and into the channel between the first and second legs of the rail member outwardly urges one of the resilient legs away from the channel of the rail member and toward the first inclined portion of the panel to further retain the panel on the rail member.

These and other objects, features and advantages of the present invention will become more fully apparent upon consideration of the following Detailed Description of the Invention with the accompanying drawings, which may be disproportionate for ease of understanding, wherein like structure and steps are referenced by corresponding numerals and indicators.

DETAILED DESCRIPTION OF THE INVENTION

Figure 1:
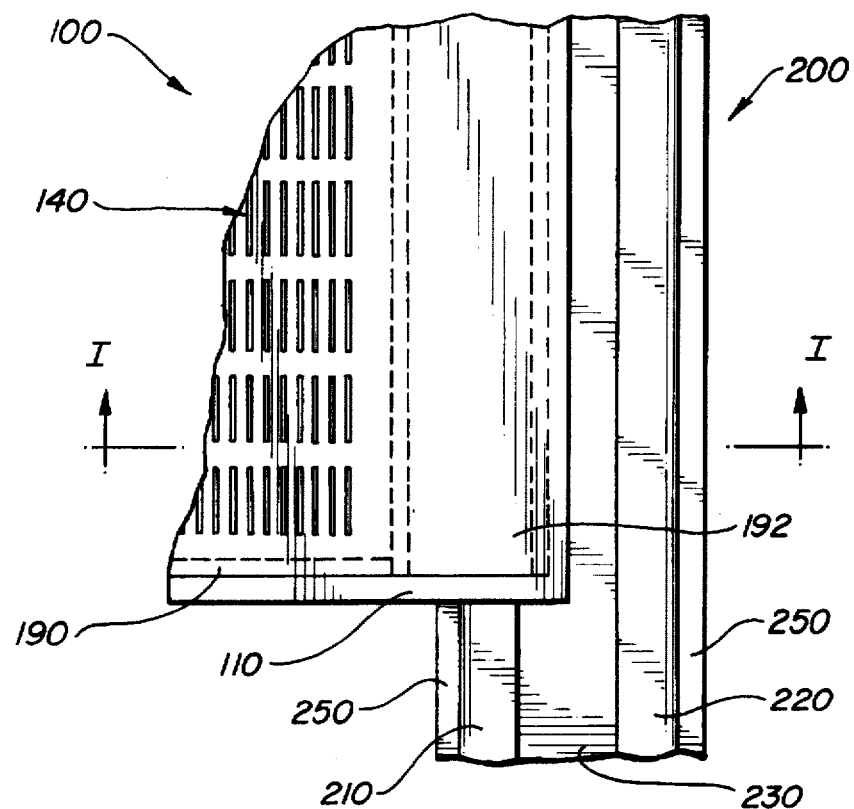
FIG. 1 is a partial plan view of a panel, which in the exemplary embodiment is a materials screening panel, mounted on a rail member according to one embodiment of the invention.

FIG. 1 is a partial plan view of a panel 100 mountable on a support member 200 according to one embodiment of the invention. The panel includes a first side portion 110 and an opposing second side portion, not shown in the drawing, which in the exemplary embodiment have linear shapes but in general may have curvilinear shapes. The panel also includes a first outer surface 120 and a substantially opposing second outer surface 130, which in the exemplary embodiment are upper and lower surfaces, respectively. In most applications, the first side portion of the panel includes a mounting surface mountable on a first support member and the second side portion of the panel includes a similar mounting surface mountable on a second support member spaced apart from the first support member wherein at least one side portion of the panel is mountable on a support member as further discussed below. The panels of the several exemplary embodiments of the invention include apertures 140 usable for materials screening but the method and apparatus are generally usable for mounting any type of panel on one or more support members.

The support member includes a first resilient leg 210 and a second resilient leg 220 separated by a channel 230, which forms a rail member 203. Each resilient leg has an inner leg surface 212 and an outer leg surface 214, and in some alternative embodiments each inner leg surface includes a lip 216 protruding toward the channel, which are identified for clarity only on the resilient leg 220 in FIG. 2. The rail member 203 also includes a panel support surface, which in one embodiment is an upper surface 240 of the resilient legs, and in another embodiment is a support ledge 250 outwardly protruding from the rail member beyond the resilient legs. In yet another embodiment the panel is supported by both the upper surface of the resilient legs and by the outwardly protruding support surface. The mounting surface of the panel 100 may therefore include any one or more of the second outer surface 130 or an intermediate ledge 135 shown in the exemplary embodiment. The rail member is mountable on an underlying structure like a metal frame S by a fastening member like a bolt B extending through a bore in the rail member, which are both shown in phantom lines in FIGS. 2 and 3. The rail member is formed of a resilient material like polyurethane, in a molding process, and may include a metal reinforcing member, not shown in the drawing, along the major dimension of the rail member or in the area of the fastening member. In the exemplary embodiment, the rail member is a longitudinal member, which may form part of a grid of longitudinal members that support an array of adjacent panels comprising a deck. The rail member however may also have a curvilinear shape corresponding to a curvilinear side of the panel.

Figure 2:
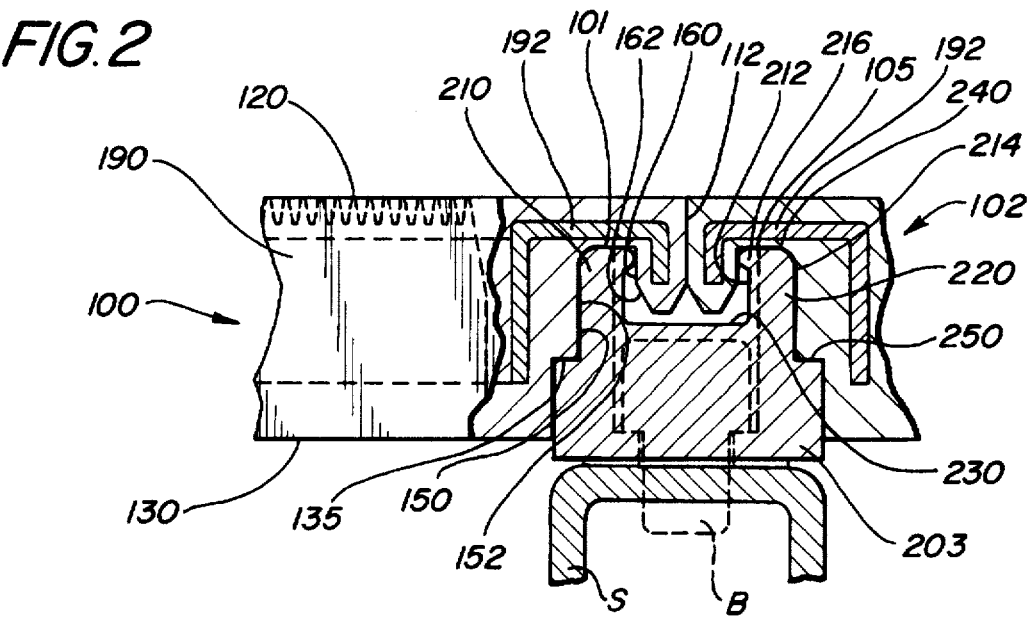
FIG. 2 is a partial sectional view taken along lines I—I of FIG. 1, which further illustrates a partial sectional view of a second panel mounted on the rail member adjacent the panel of FIG. 1.

FIG. 2 is a partial sectional view taken along lines I—I of FIG. 1, and further illustrates a partial sectional view of a second panel 102 mounted on the rail member 203 wherein the second panel 102 is adjacent the panel 100 of FIG. 1. A first groove 101 is disposed along the first side portion of the panel 100 for receiving a portion of the resilient leg 210 of the rail member 203. The adjacent panel 102 has a similar groove 105, which is a mirror image of the groove 101 in the panel 100, for receiving a portion of the resilient leg 220. The groove in each panel extends from the second outer surface 130 toward the first outer surface 120 so that the first outer surface of the panel extends over the resilient leg received in the groove 101 or 105. Each groove has a first side surface 150 with a first inclined portion 152 and a second side surface 160 with a second lower inclined or beveled portion 162, which are identified for clarity only on the panel 100 in FIG. 2. The first inclined portion 152 is tapered or inclined away from a first end 112 of the panel as the first inclined portion extends toward the first outer surface 120 of the panel. The second inclined surface or bevelled portion 162 of the groove is initially engagable with the inner leg surface 212 of the resilient leg 210 as the panel is mounted on the rail member 203. When the resilient leg 210 is disposed in the groove 101 of the panel, the second side surface 160 of the groove outwardly urges the resilient leg 210 away from the channel of the rail member and toward the first inclined portion 152 of the groove 101 to retain the panel on the rail member. The outwardly flexed resilient leg 210 in cooperation with the inclined portion 152 prevents separation of the panel from the rail member. In an alternative embodiment, the second side surface 160 includes a lip protruding into the groove, not shown in the drawing, engagable with the surface 212 in the recess below the lip 216 of the resilient leg to further retain the panel on the rail member. The second side portion of the panel 100, not shown in the drawing, may also include a groove similar in configuration to the structure shown on panel 102, which is mountable on and retained by a resilient leg of a second rail member space apart from the first rail member 200. Alternatively, the second side portion of the panel 100 is mountable on some other support structure by a hinge or other conventional means.

Figure 3:
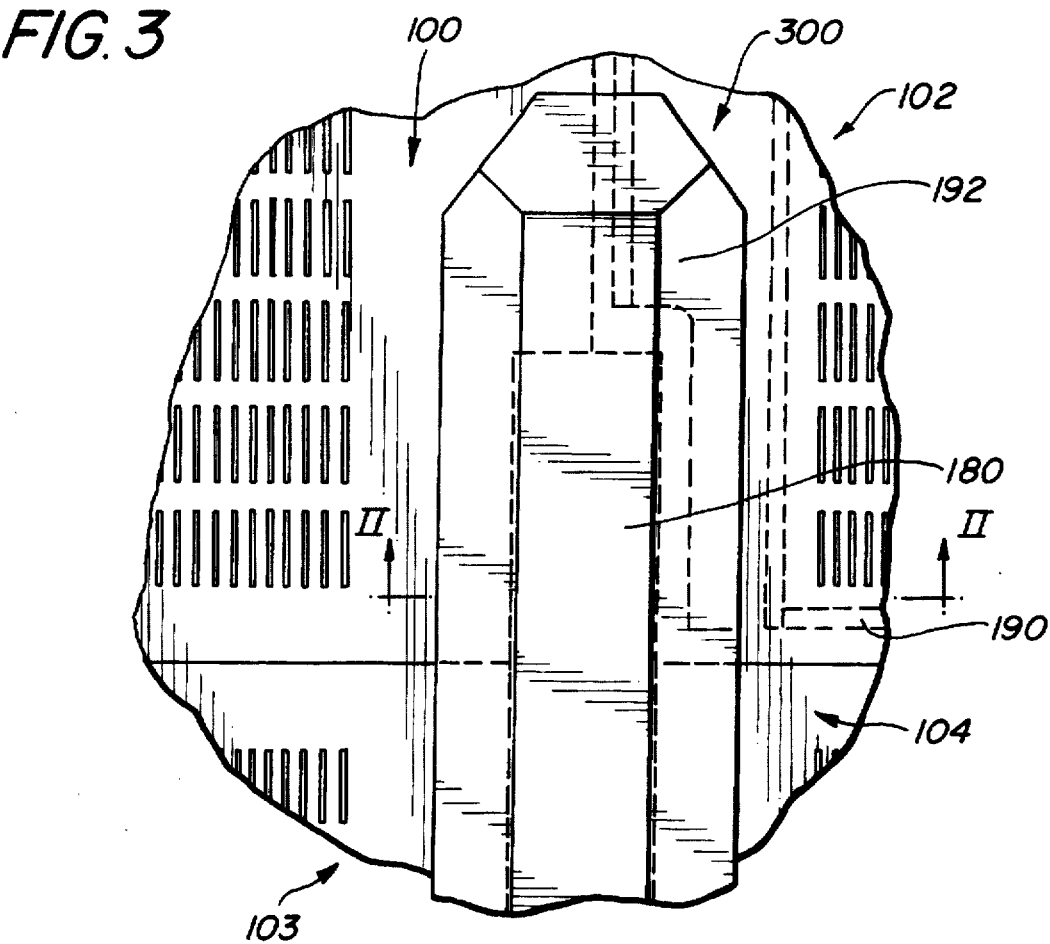
FIG. 3 is a partial plan view of four adjacent panels mounted on a rail member, which according to another embodiment of the invention are in part fastened thereon by an elongate retention member.
Figure 4:
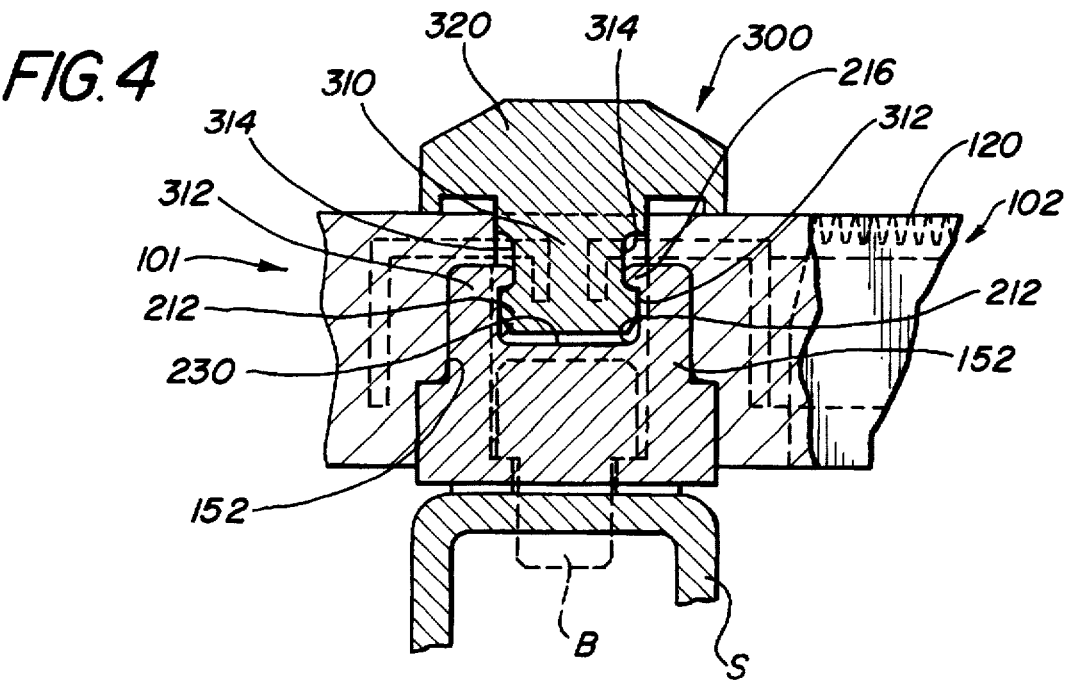
FIG. 4 is a partial sectional view taken along lines II—II of FIG. 3 to illustrate the retention member and two of the four adjacent panels mounted on the rail member.

FIG. 3 is a partial plan view of four adjacent panels 100, 102, 103 and 104 mounted on a rail member wherein according to another embodiment of the invention each panel is further retained on the rail member by an elongate retention member 300 in combination with the structure discussed above with reference to FIGS. 1 and 2. The panels of FIGS. 3 and 4 each include a recessed portion 180 shown by phantom lines to provide access to the channel 230 of the rail member from the first outer surface 120 of the panel. FIG. 4 is a partial sectional view taken along lines II—II of FIG. 3 and illustrates the elongate retention member 300 disposed through the recess of panels 100 and 102 and into the channel 230 of the rail member. The retention member includes a base 310 with substantially opposing outer side surfaces 312 that engage the inner leg surfaces 212 of the resilient legs to outwardly urge the resilient legs away from the channel of the rail member and toward the first inclined surface 152 of the groove in the corresponding adjacent panel to further retain the panel on the rail member. In the exemplary embodiment, the recess 180 is located in a corner portion of the panels so that four adjacent panels may be further retained on the rail member by a single elongate retention member 300, which reduces the number of retention members required to retain the panels. In this way, the elongate retention member prevents separation of the panel from the rail member.

In an alternative embodiment, the resilient legs each include a lip 216, and the outer side surfaces of the base 310 of the elongate member each include a recess 314 for receiving a lip 216 on a corresponding resilient leg when the base is disposed into the channel of the rail member, which further retains the elongate member on the rail member. The elongate member may also include a crown 320 protruding above the first outer surface 120 of the panels when the base is disposed into the channel of the rail member. The protruding crown may be configured to receive a tool to facilitate removal of the elongate retention member from the rail member. In the exemplary embodiment, the crown is shaped to direct or divert the flow of material over the panels and away from the non-porous portions of the panels, which increases filtering efficiency in materials screening operations.

In another embodiment, the elongate member is a continuous strip that extends along the dimension of the panel or series of adjacent panels to retain the panels on the rail member as discussed with reference to FIG. 4 without the combined retention effect resulting from the second surfaces 160 and 162 outwardly urging the resilient legs toward the first inclined surface 152 as discussed with reference to FIG. 2. In this alternative embodiment, the portion of the panel, including the second side surface 160, that extends into the channel of the rail member to outwardly urge the resilient legs is eliminated, and the first outer surface of the panel extends over the resilient leg to the extent required to support the panel while providing access to the channel of the rail member. The base of the elongate retention member outwardly urges the resilient legs toward the first inclined surface 152 of the panel to retain the panel on the rail member. The elongate retention member is disposed in the channel of the rail member, and in general extends along the length of the rail member to retain adjacent panels mounted thereon.

The panel may be formed of many different materials, and in the exemplary embodiments is formed of a plastic like polyurethane. In some applications, like minerals screening applications, plastic panels may require a reinforcing metal frame 190, as shown by phantom lines in FIGS. 1 and 3. In the exemplary embodiments, the frame includes an L-shape flange portion 192 adjacent the first outer surface for reinforcing the channel 230 and the second side surface 160 of the panel shown in partial sectional views in FIGS. 2 and 4. The elongate retention member is likewise formable of a plastic material, which may include a reinforcing metal. The resilient nature of plastic materials like polyurethane permits ready installation and removal of the panels and retention members to and from the rail member with reduced labor and without destruction of the panels and retention members.

In one embodiment, the panels are screens adjacently placed or mounted on rails to form an array of screens in an enclosed area bounded by end walls. The outer surfaces of the outer screens abut the end walls to prevent the screens from sliding along the rails.

While the foregoing written description of the invention enables anyone skilled in the art to make and use what is at present considered to be the best mode of the invention, it will be appreciated and understood by those skilled in the art the existence of variations, combinations, modifications and equivalents within the spirit and scope of the specific exemplary embodiments disclosed herein. The present invention therefore is to be limited not by the specific exemplary embodiments disclosed herein but by all embodiments within the scope of the appended claims.

What is claimed is:

1. A panel mountable on a first rail member having first and second resilient legs separated by a channel, each resilient leg having an outer leg surface and an inner leg surface, the panel comprising:

a first side, an upper surface and a substantially opposing lower surface;

a first groove disposed along the first side of the panel for receiving a portion of one of the resilient legs of the first rail member, the first groove having a first side surface with a first inclined portion and a second side surface with a second inclined portion, the first groove extending from the lower surface toward the upper surface so that the upper surface of the panel extends over the resilient leg received in the first groove, wherein the second side surface of the first groove is engagable with the inner leg surface of the resilient leg received in the first groove to outwardly urge the resilient leg away from the channel of the first rail member and toward the first inclined portion of the first side surface of the first groove to retain the panel on the first rail member, and wherein the other resilient leg of the first rail member is receivable in a groove of an adjacent panel.

2. The panel of claim 1 further comprising a mounting surface along the first side of the panel for mounting the panel on a support ledge protruding outwardly from the first rail member beyond the outer leg surface.

3. The panel of claim 1 further comprising a screen portion for materials screening.

4. The panel of claim 1 wherein the panel is mountable on the first rail member and on a substantially similar second rail member space apart from the first rail member, the panel further comprising:

a second side substantially opposing the first side;

a second groove disposed along the second side of the panel for receiving a portion of one of the resilient legs of the second rail member, the second groove having a first side surface with a first inclined portion and a second side surface with a second inclined portion, the second groove extending from the lower surface toward the upper surface so that the upper surface of the panel extends over the resilient leg received in the second groove, wherein the second side surface of the second groove is engagable with the inner leg surface of the resilient leg received in the second groove to outwardly urge the resilient leg away from the channel of the second rail member and toward the first inclined portion of the first side surface of the second groove to retain the panel on the second rail member, and wherein the other resilient leg of the second rail member is receivable in a groove of an adjacent panel.

5. The panel of claim 1 further comprising:

a recessed portion on the first side of the panel to provide access to the channel of the first rail member from the upper surface of the panel; and an elongate retention member having a base disposable into the channel between the first and second legs of the first rail member, the base having substantially opposing outer surfaces that engage the inner leg surfaces of the first and second resilient legs to outwardly urge the resilient legs away from the channel of the first rail member, wherein the resilient leg received in the first groove is urged toward the first inclined portion of the first groove to retain the panel on the first rail member.

6. The panel of claim 5 wherein the first rail member includes a lip disposed on the inner leg surface of each resilient leg, the elongate fastening member having a recess disposed along each opposing outer surface of the base, wherein the lips of the inner leg surfaces are disposed in the recesses of the base when the base of the elongate retention member is disposed into the channel of the first rail member to further retain the elongate retention member in the first rail member.

7. The panel of claim 6 further comprising a screen portion for materials screening, wherein the elongate retention member includes a crown protruding above the upper surface of the panel when the base is disposed into the channel of the first rail member, the crown usable to divert the flow of material over the panel.

8. A system for mounting a panel on a first rail member having a panel support surface and first and second resilient legs separated by a channel, each resilient leg having an outer leg surface and an inner leg surface, the system comprising:

a panel having a first side, an upper surface and a substantially opposing lower surface, and a mounting surface along the first side for mounting the panel on the support surface of the first rail member, the first side having a first inclined portion extending along the first side of the panel;

an elongate retention member having a base disposable into the channel between the first and second legs of the first rail member, the base having substantially opposing outer surfaces that engage the inner leg surfaces of the first and second resilient legs to outwardly urge the resilient legs away from the channel of the first rail member wherein one of the resilient legs is urged toward the first inclined portion of the panel to retain the panel on the first rail member.

9. A method for mounting a panel on a first rail member having first and second resilient legs separated by a channel, each resilient leg having an outer leg surface and an inner leg surface, the method comprising steps of:

mounting a first side of the panel on a support surface of the first rail member;

disposing a portion of one of the resilient legs of the first rail member into a first groove disposed along a portion of the first side of the panel; and outwardly urging the resilient leg disposed into the first groove of the panel away from the channel of the first rail member and toward a first inclined portion of a first side surface of the first groove by engaging the inner leg surface of the resilient leg with a second side surface of the groove to retain the panel on the first rail member.

10. The method of claim 9 further comprising steps of:

disposing a base of an elongate retention member through a recess in the first side of the panel and into the channel between the first and second legs of the first rail member; and outwardly urging the resilient legs away from the channel of the first rail member by engaging the inner leg surfaces of the first and second resilient legs with substantially opposing outer surfaces of the base of the elongate member, to urge the resilient leg disposed in the groove toward the first inclined portion to further retain the panel on the first rail member.

* * * * *